United States Patent
Kotani et al.

(10) Patent No.: US 9,779,853 B2
(45) Date of Patent: Oct. 3, 2017

(54) INSULATING THERMALLY CONDUCTIVE RESIN COMPOSITION

(71) Applicant: Panasonic Corporation, Osaka (JP)

(72) Inventors: Yuki Kotani, Osaka (JP); Hiroyoshi Yoden, Osaka (JP); Hajime Kishi, Hyogo (JP); Takashi Saruwatari, Mie (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/778,837

(22) PCT Filed: Mar. 3, 2014

(86) PCT No.: PCT/JP2014/001135
§ 371 (c)(1),
(2) Date: Sep. 21, 2015

(87) PCT Pub. No.: WO2014/155975
PCT Pub. Date: Oct. 2, 2014

(65) Prior Publication Data
US 2016/0042831 A1    Feb. 11, 2016

(30) Foreign Application Priority Data
Mar. 28, 2013 (JP) .................. 2013-068846

(51) Int. Cl.
*H01B 3/40*  (2006.01)
*C08L 63/00* (2006.01)
(Continued)

(52) U.S. Cl.
CPC ............. *H01B 3/40* (2013.01); *C08K 3/22* (2013.01); *C08K 3/28* (2013.01); *C08L 63/00* (2013.01);
(Continued)

(58) Field of Classification Search
CPC ........................................ C08K 3/22
See application file for complete search history.

(56) References Cited

U.S. PATENT DOCUMENTS

2011/0129677 A1    6/2011    Fukuoka et al.

FOREIGN PATENT DOCUMENTS

| EP | 1 254 926 A1 | 11/2002 |
|---|---|---|
| JP | S63-10616 A | 1/1988 |
| JP | H04-211422 A | 8/1992 |
| JP | H04-300914 A | 10/1992 |
| JP | H04-342719 A | 11/1992 |
| JP | H04-345640 A | 12/1992 |
| JP | 09-059511 A | 3/1997 |
| JP | 2005-255867 A | 9/2005 |
| JP | 2009-263476 A | 11/2009 |
| JP | 2010-065064 A | 3/2010 |

(Continued)

OTHER PUBLICATIONS

International Search Report for corresponding International Application No. PCT/JP2014/001135 dated May 13, 2014.
(Continued)

*Primary Examiner* — Megan McCulley
(74) *Attorney, Agent, or Firm* — Renner, Otto, Boisselle & Sklar, LLP

(57) ABSTRACT

An insulating thermally conductive resin composition (1) includes a phase-separated structure including: a first resin phase (2) in which a first resin continues three-dimensionally; and a second resin phase (3) different from the first resin phase and formed of a second resin. Moreover, the insulating thermally conductive resin composition includes: small-diameter inorganic filler (4) unevenly distributed in the first resin phase; and large-diameter inorganic filler (5) that spans the first resin phase and the second resin phase and thermally connects pieces of the small-diameter inorganic filler, which is unevenly distributed in the first resin phase, to one another. Then, an average particle diameter of the small-diameter inorganic filler is 0.1 to 15 μm. Moreover, an average particle diameter of the large-diameter inorganic filler is larger than the average particle diameter of the small-diameter inorganic filler, and is 1 to 100 μm.

7 Claims, 4 Drawing Sheets

(51) Int. Cl.
  *C08L 81/06*   (2006.01)
  *C08L 101/12*  (2006.01)
  *H01B 3/00*    (2006.01)
  *H01B 3/30*    (2006.01)
  *C08K 3/22*    (2006.01)
  *C08K 3/28*    (2006.01)
  *C09K 5/14*    (2006.01)

(52) U.S. Cl.
  CPC .............. *C08L 81/06* (2013.01); *C08L 101/12* (2013.01); *C09K 5/14* (2013.01); *H01B 3/006* (2013.01); *H01B 3/301* (2013.01); *C08K 2003/222* (2013.01); *C08K 2003/2227* (2013.01)

(56) References Cited

FOREIGN PATENT DOCUMENTS

JP    2010-132838 A    6/2010
JP    2010-132894 A    6/2010

OTHER PUBLICATIONS

Form PCT/ISA/237 for corresponding International Application No. PCT/JP2014/001135 dated May 13, 2014.
Extended European Search Report dated Mar. 16, 2016 for corresponding International Application No. 14772690.5.

(a)

(b)

(c)

(d)

INSULATING THERMALLY CONDUCTIVE RESIN COMPOSITION

TECHNICAL FIELD

The present invention relates to an insulating thermally conductive resin composition. More specifically, the present invention relates to an insulating thermally conductive resin composition for use in a thermally conductive component that cools an electronic component and the like, for example, for use in a radiator.

BACKGROUND ART

A semiconductor such as a computer (central processing unit: CPU), a transistor and a light emitting diode (LED) generates heat during use thereof, and performance of such an electronic component decreases owing to the heat in some case. Therefore, in usual, a radiator is mounted on such an electronic component that generates heat.

Heretofore, for such a radiator as described above, metal having high thermal conductivity has been used. Note that, in recent years, an insulating thermally conductive resin composition, which has a high degree of freedom in shape selection and is easy to reduce weight and miniaturize, has been going to be used. For the purpose of enhancing the thermal conductivity, the insulating thermally conductive resin composition as described above must contain a large amount of a thermally conductive inorganic filler in a binder resin. However, it is known that a variety of problems occur if a blending amount of the thermally conductive inorganic filler is simply increased. For example, by increasing the blending amount of the thermally conductive inorganic filler, viscosity of the resin composition that is not still cured is increased, and moldability and workability thereof decrease to a large extent, causing a molding failure. Moreover, an amount of such a fillable inorganic filler has a limit, and accordingly, in many cases, the resin composition to be thus obtained does not have sufficient thermal conductivity (for example, refer to Patent Literatures 1 to 5).

Accordingly, there is disclosed a method for enhancing the thermal conductivity in such a manner that a bicontinuous phase-separated structure is formed by using a plurality of resins, and a thermally conductive filler is unevenly distributed on one of resin phases or a resin interface to thereby form a thermal conduction path (for example, refer to Patent Literatures 6 and 7).

CITATION LIST

Patent Literature

Patent Literature 1: Japanese Unexamined Patent Application Publication No. S63-10616
Patent Literature 2: Japanese Unexamined Patent Application Publication No. H4-342719
Patent Literature 3: Japanese Unexamined Patent Application Publication No. H4-300914
Patent Literature 4: Japanese Unexamined Patent Application Publication No. H4-211422
Patent Literature 5: Japanese Unexamined Patent Application Publication No. H4-345640
Patent Literature 6: Japanese Unexamined Patent Application Publication No. 2010-65064
Patent Literature 7: Japanese Unexamined Patent Application Publication No. 2010-132894

SUMMARY OF INVENTION

However, if only the thermally conductive filler is unevenly distributed as in Patent Literatures 6 and 7, then it is apprehended that the moldability may be deteriorated since some filling amount is required to enhance the thermal conductivity. Moreover, it is difficult to continuously form the thermal conduction path, and the thermal conduction path is sometimes divided by the resin phases. Therefore, materials in Patent Literatures 6 and 7 still have had insufficient thermal conductivity.

The present invention has been made in consideration of such a problem as described above, which is inherent in the prior art. Then, it is an object of the present invention to provide an insulating thermally conductive resin composition, which is excellent in moldability while having high thermal conductivity.

An insulating thermally conductive resin composition according to a first aspect of the present invention includes a phase-separated structure including: a first resin phase in which a first resin continues three-dimensionally; and a second resin phase different from the first resin phase and formed of a second resin. Moreover, the insulating thermally conductive resin composition includes: small-diameter inorganic filler unevenly distributed in the first resin phase; and large-diameter inorganic filler that spans the first resin phase and the second resin phase and thermally connects pieces of the small-diameter inorganic filler, which is unevenly distributed in the first resin phase, to one another. An average particle diameter of the small-diameter inorganic filler is 0.1 to 15 µm. Moreover, an average particle diameter of the large-diameter inorganic filler is larger than the average particle diameter of the small-diameter inorganic filler, and is 1 to 100 µm.

An insulating thermally conductive resin composition according to a second aspect of the present invention relates to the resin composition according to the first aspect, wherein the small-diameter inorganic filler is present on an interface between the first resin phase and the second resin phase.

An insulating thermally conductive resin composition according to a third aspect of the present invention relates to the resin composition according to either one of the first and second aspects, wherein the small-diameter inorganic filler is brought into contact with the interface between the first resin phase and the second resin phase, or spans the interface.

An insulating thermally conductive resin composition according to a fourth aspect of the present invention relates to the resin composition according to any one of the first to third aspects, wherein, in the first resin phase, thermal conduction paths are formed by bringing the pieces of the small-diameter inorganic filler in contact with one another.

An insulating thermally conductive resin composition according to a fifth aspect of the present invention relates to the resin composition according to any one of the first to fourth aspects, wherein a ratio of a sum of the small-diameter inorganic filler and the large-diameter inorganic filler in the insulating thermally conductive resin composition is 10 to 80% by volume. Moreover, a ratio of the large-diameter inorganic filler in the sum of the small-diameter inorganic filler and the large-diameter inorganic filler is 5 to 60% by volume.

An insulating thermally conductive resin composition according to a sixth aspect of the present invention relates to the resin composition according to any one of the first to fifth aspects, wherein the small-diameter inorganic filler and the large-diameter inorganic filler contain at least one selected from the group consisting of MgO, $Al_2O_3$, BN and AlN.

An insulating thermally conductive resin composition according to a seventh aspect of the present invention relates to the resin composition according to any one of the first to sixth aspects, wherein the first resin phase is formed of either one of a thermosetting resin and a thermoplastic resin, and the second resin phase is formed of other of the thermosetting resin and the thermoplastic resin. Moreover, the thermosetting resin is an epoxy resin, and the thermoplastic resin is polyether sulfone.

An insulating thermally conductive resin composition according to an eighth aspect of the present invention relates to the resin composition according to the seventh aspect, wherein the phase-separated structure is a bicontinuous structure, and the small-diameter inorganic filler and the large-diameter inorganic filler contain at least one of MgO, $Al_2O_3$ and BN. Moreover, the ratio of the sum of the small-diameter inorganic filler and the large-diameter inorganic filler in the insulating thermally conductive resin composition is 20 to 80% by volume, and thermal conductivity of the insulating thermally conductive resin composition is 3 W/m·K or more.

BRIEF DESCRIPTION OF DRAWINGS

FIG. 3(a) shows a sea-island structure; FIG. 3(b) shows a continuously spherical structure; FIG. 3(c) shows a composite/dispersion structure; and FIG. 3(d) shows a bicontinuous structure.

DESCRIPTION OF EMBODIMENTS

A description is made below of an insulating thermally conductive resin composition according to an embodiment of the present invention. Note that dimensional ratios of the drawings are exaggerated for convenience of explanation, and are sometimes different from actual ratios.

Figure 1:
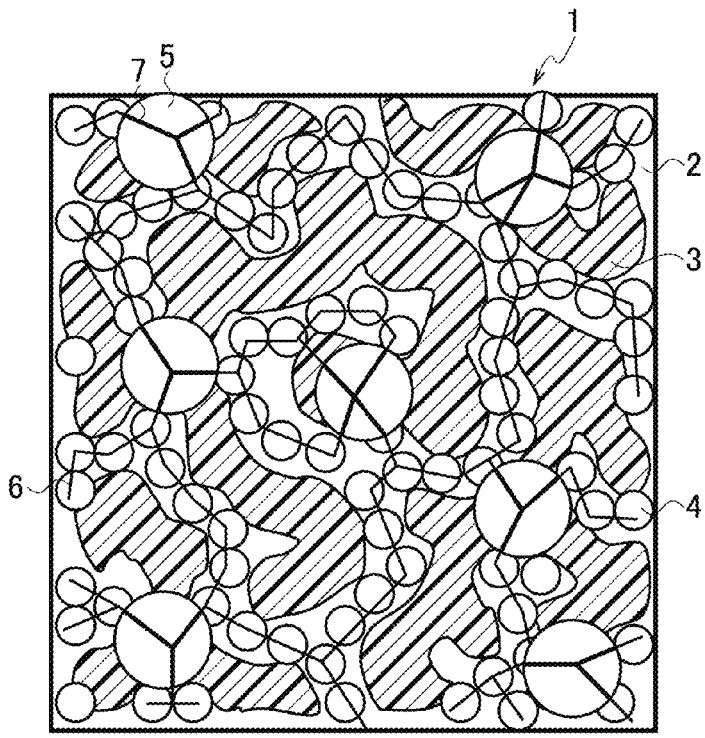
FIG. 1 is a schematic view showing an insulating thermally conductive resin composition according to an embodiment of the present invention.

As shown in FIG. 1, an insulating thermally conductive resin composition 1 according to the embodiment of the present invention includes a phase-separated structure including: a first resin phase 2 in which a first resin continues three-dimensionally; and a second resin phase 3, which is different from the first resin phase 2 and is formed of a second resin. Moreover, in the first resin phase 2, small-diameter inorganic filler 4 with an average particle diameter of 0.1 μm to 15 μm is unevenly distributed. Then, the insulating thermally conductive resin composition 1 contains large-diameter inorganic filler, which spans the first resin phase and the second resin phase, thermally and mutually connects pieces of the small-diameter inorganic filler distributed unevenly in the first resin layer, and further, has an average particle diameter of 1 μm to 100 μm.

The insulating thermally conductive resin composition 1 of this embodiment has a structure including the first resin phase 2 and the second resin phase 3, in which these resin phases are mixed with each other, and are phase-separated from each other. Moreover, the small-diameter inorganic filler 4 is unevenly distributed in the first resin phase 2, and the small-diameter inorganic filler 4 is brought into mutual and continuous contact. Therefore, thermal conduction paths 6 for transferring thermal energy are formed in an inside of the first resin phase 2, and accordingly, thermal conductivity of the insulating thermally conductive resin composition 1 can be enhanced.

Moreover, as shown in FIG. 1, the insulating thermally conductive resin composition 1 includes the large-diameter inorganic filler 5 disposed so as to span the first resin phase 2 and the second resin phase 3. The large-diameter inorganic filler 5 contacts the unevenly distributed small-diameter inorganic filler 4, thereby forming thermal conduction paths 7. Therefore, the thermal conduction paths 6, which are formed of the small-diameter inorganic filler 4 and are adjacent to the thermal conduction paths 7 formed of the large-diameter inorganic filler 5, are thermally connected to the thermal conduction paths 7. As a result, a route of thermal conduction is increased in an inside of the insulating thermally conductive resin composition 1, and accordingly, it becomes possible to enhance the thermal conduction thereof.

Figure 2:
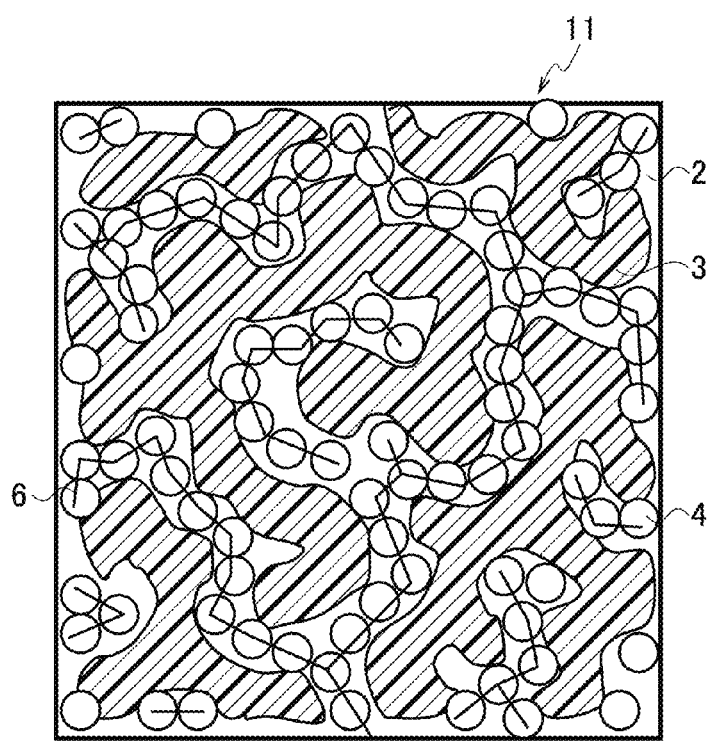
FIG. 2 is a schematic view showing a state of removing large-diameter inorganic filler from the insulating thermally conductive resin composition according to the embodiment of the present invention.

Here, FIG. 2 shows a state of removing the large-diameter inorganic filler from the insulating thermally conductive resin composition according to this embodiment. A resin composition 11 of FIG. 2 adopts a structure in which the first resin phase 2 and the second resin phase 3 are phase-separated from each other. Moreover, in the resin composition 11, the small-diameter inorganic filler 4 is unevenly distributed in the first resin phase 2, whereby the inorganic filler is brought into mutual contact, and forms the thermal conduction paths 6. Therefore, it is easy to form the thermal conduction paths in comparison with a case of not using the phase-separated structure. However, if only the small-diameter inorganic filler 4 is disposed in the first resin phase 2, then a large amount of the small-diameter inorganic filler 4 is required to enhance the thermal conduction. Moreover, it is difficult to form the thermal conduction paths 6 completely continuously, and the thermal conduction paths 6 are sometimes divided by the second resin phase 3, and accordingly, the thermal conductivity is still insufficient.

In contrast, in the insulating thermally conductive resin composition 1 according to this embodiment, the large-diameter inorganic filler 5 is disposed. Then, between the thermal conduction paths 6 formed of the small-diameter inorganic filler 4, the second resin phase 3 is present, and the insulating thermally conductive resin composition 1 contains the large-diameter inorganic filler 5, whereby the thermal conduction paths 7 which connect the thermal conduction paths 6 to one another is formed. Therefore, the thermal conduction in the inside of the resin composition is performed not only in the thermal conduction paths 6 but also in the thermal conduction paths 7, and accordingly, the thermal conductivity can be enhanced to a large extent.

Moreover, as mentioned above, it is difficult to form the thermal conduction paths 6 completely continuously by bringing all pieces of the small-diameter inorganic filler 4 into contact with one another in the inside of the first resin phase 2. If all pieces of the small-diameter inorganic filler 4 are attempted to be brought into contact with one another, then it is necessary to add a large amount of the small-diameter inorganic filler 4, and accordingly, viscosity of the resin composition is increased, causing an apprehension that moldability may be deteriorated. In contrast, in this embodiment, not only the small-diameter inorganic filler 4 but also the large-diameter inorganic filler 5 is added. Therefore, even in a case where a part of the small-diameter inorganic filler 4 is divided, and the thermal conduction paths 6 do not continue with one another completely, then the thermal conduction paths 7 are formed of the large-diameter inorganic filler 5, and accordingly, the thermal conduction paths in the inside of the resin composition are ensured, and the thermal conductivity can be enhanced.

Note that, in FIG. 1, the small-diameter inorganic filler 4 is unevenly distributed in the first resin phase 2; however, may be unevenly distributed in the second resin phase 3. Moreover, it is not necessary that all pieces of the small-diameter inorganic filler 4 be disposed in the inside of the first resin phase 2, and a part thereof may be disposed in the second resin phase 3.

Figure 3:
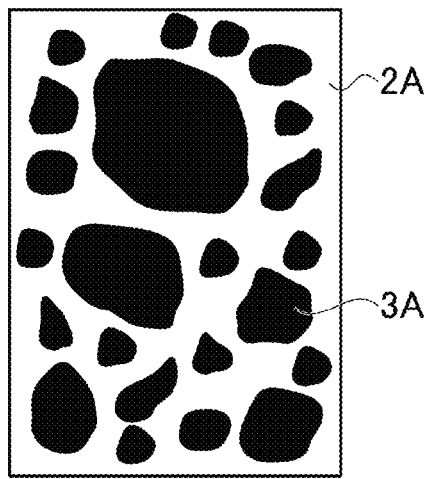
FIGS. 3(a) to 3(d) are schematic views for explaining a phase-separated structure.
Figure 3:
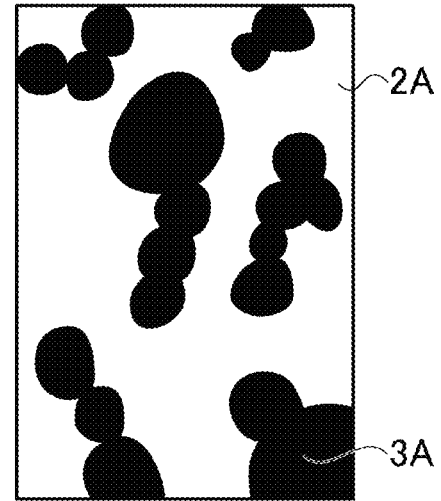
Figure 3:
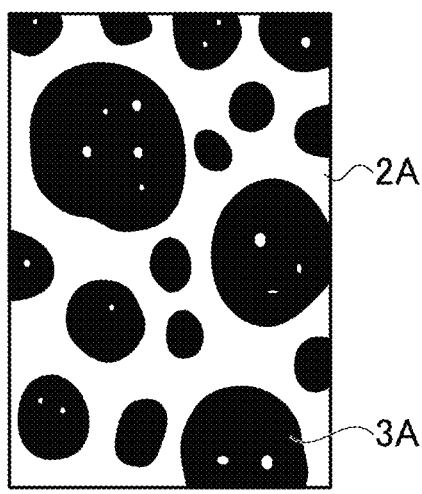
Figure 3:
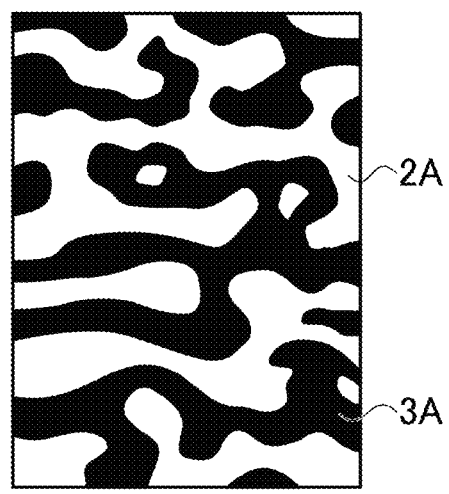

The phase-separated structure in this embodiment refers to any of a sea-island structure, a continuously spherical structure, a composite/dispersion structure and a bicontinuous structure. As shown in FIG. 3(a), the sea-island structure refers to a structure in which a dispersed phase 3A with a small volume is dispersed into a continuous phase 2A, and is a structure in which the dispersed phase 3A, which is particulate or spherical, scatters in the continuous phase 2A. As shown in FIG. 3(b), the continuously spherical structure is a structure in which pieces of substantially spherical dispersed phase 3a are coupled to one another, and are dispersed into the continuous phase 2A. As shown in FIG. 3(c), the composite/dispersion structure is a structure in which the dispersed phase 3A scatters in the continuous phase 2A, and a resin composing the continuous phase scatters in the dispersed phase 3A. As shown in FIG. 3(d), the bicontinuous structure is a structure in which the continuous phase 2A and the dispersed phase 3A form a complicated three-dimensional mesh shape.

In this embodiment, it is necessary that the first resin phase 2 in which the small-diameter inorganic filler 4 is unevenly distributed continue three-dimensionally. In such a way, the small-diameter inorganic filler 4 is disposed in the inside of the first resin phase 2, whereby the thermal conduction paths 6 can be formed. Therefore, in cases of the above-described sea-island structure, continuously spherical structure and composite/dispersion structure, it is necessary that the continuous phase 2A be the first resin phase 2. However, in a case of the bicontinuous structure, both of the continuous phase 2A and the dispersed phase 3A continue three-dimensionally, and accordingly, either one thereof just needs to compose the first resin phase 2.

Note that the phase-separated structure such as the sea-island structure, the continuously spherical structure, the composite/dispersion structure and the bicontinuous structure can be obtained by controlling curing conditions for the resin composition, such as a curing rate and reaction temperature, and compatibility and compounding ratio of the resin.

As mentioned above, in this embodiment, the small-diameter inorganic filler 4 is unevenly distributed in the first resin phase 2, and the small-diameter inorganic filler is brought into mutual contact, whereby the thermal conduction paths 6 are formed. Therefore, as long as the thermal conduction paths 6 are formed, the small-diameter inorganic filler 4 may be present with a uniform density or unevenly present in the inside of the first resin phase 2.

Moreover, the small-diameter inorganic filler 4 may be present on an interface between the first resin phase 2 and the second resin phase 3. That is to say, in the inside of the first resin phase 2, the small-diameter inorganic filler 4 may be present more in a vicinity of the interface between the first resin phase 2 and the second resin phase 3 than in a center portion of the first resin phase 2. In this event, it is preferable that the small-diameter inorganic filler 4 be brought into contact with the interface between the first resin phase 2 and the second resin phase 3. Moreover, a part of the particles which compose the small-diameter inorganic filler 4 may be disposed so as to span the interface between the first resin phase 2 and the second resin phase 3. As described above, the small-diameter inorganic filler 4 is present on the interface between the first resin phase and the second resin phase, whereby it becomes easy for the small-diameter inorganic filler 4 to be brought into mutual contact in the vicinity of the interface in the inside of the first resin phase 2. Therefore, it becomes possible to form the continuous thermal conduction paths 6 in the vicinity of the interface between the first resin phase and the second resin phase.

In this embodiment, it is preferable that the first resin phase 2 be formed of either one of a thermosetting resin and a thermoplastic resin, and that the second resin phase 3 be formed of other of the thermosetting resin and the thermoplastic resin. That is to say, in a case where the first resin phase 2 is composed of the thermosetting resin, it is preferable that the second resin phase 3 be composed of the thermoplastic resin. Moreover, in a case where the first resin phase 2 is composed of the thermoplastic resin, it is preferable that the second resin phase 3 be composed of the thermosetting resin. In such a way, it becomes easy to form the above-described phase-separated structure.

As the thermosetting resin, there are mentioned an epoxy resin, an unsaturated polyester resin, a vinyl ester resin, a phenol resin, a urethane resin, a urea resin, a melamine resin, a maleimide resin, a cyanate ester resin, an alkyd resin, an addition-curable polyimide resin and the like. As the thermosetting resin, one of these resins may be used singly, or two or more thereof may be used in combination. Among them, the epoxy resin is preferable since the epoxy resin is excellent in heat resistance, electric insulating properties and electrical characteristics.

In a case of using the epoxy resin as the thermosetting resin, a publicly known one can be used. For example, there can be used a bisphenol A-type epoxy resin, a bisphenol F-type epoxy resin, a bisphenol S-type epoxy resin, a biphenyl-type epoxy resin, a naphthalene diol-type epoxy resin, and a phenol novolac-type epoxy resin. Moreover, there can also be used a cresol novolac-type epoxy resin, a bisphenol A novolac-type epoxy resin, a cycloaliphatic epoxy resin, and a heterocyclic epoxy resin (triglycidyl isocyanurate, diglycidyl hydantoin and the like). Furthermore, denatured epoxy resins obtained by denaturing these epoxy resins by a variety of materials, and the like can be used. Moreover, halides such as bromides and chlorides of these epoxy resins can also be used. As the epoxy resin, one of these resins may be used singly, or two or more thereof may be used in combination.

As a curing agent for curing the epoxy resin, any compound can be used as long as being a compound including an active group capable of reacting with an epoxy group. Publicly known epoxy curing agents can be used appropriately, and particularly, compounds including an amino group, an acid anhydride group and a hydroxy phenyl group are suitable. For example, there are mentioned: dicyandiamide and a derivative thereof; organic acid hydrazide; amine imide; aliphatic amine; aromatic amine; tertiary amine; salt of polyamine; micro capsule-type curing agent;

an imidazole-type curing agent, acid anhydride; phenol novolac; and the like. As the curing agent, one of these agents may be used singly, or two or more thereof may be used in combination.

Moreover, a variety of curing promotors can be used in combination with the above-described curing agents. For example, in a case of using the epoxy resin as the thermosetting resin, then as the curing promotor, there can be mentioned: a tertiary amine-based curing promotor; a urea derivative-based curing promotor; an imidazole-based curing promotor; and a 1,8-diazabicyclo[5.4.0]undec-7-ene (DBU)-based curing promotor. Moreover, there can be mentioned: an organic phosphor-based curing promotor (for example, a phosphine-based curing promotor and the like); an onium salt-based curing promotor (for example, a phosphonium salt-based curing promotor, a sulfonium salt-based curing promotor, an ammonium salt-based curing promotor and the like). Furthermore, a metal chelate-based curing promotor, acid and metal salt-based curing promotor and the like can also be mentioned.

In general, the thermoplastic resin has, in a principal chain, at least one bond selected from the group consisting of a carbon-carbon bond, an amide bond, an imide bond, an ester bond and an ether bond. Moreover, the thermoplastic resin may have, in the principal chain, at least one bond selected from the group consisting of a carbonate bond, a urethane bond, a urea bond, a thioether bond, a sulfone bond, an imidazole bond and a carbonyl bond.

As the thermoplastic resin, for example, there are mentioned: a polyolefin-based resin; a polyamide-based resin; an elastomer-based (styrene-based, olefin-based, polyvinyl chloride (PVC)-based, urethane-based, ester-based, and amide-based) resin; an acrylic resin; a polyester-based resin; and the like. Moreover, there are mentioned: engineering plastics; polyethylene; polypropylene; a Nylon resin; an acrylonitrile-butadiene-styrene (ABS) resin; an acrylic resin; an ethylene acrylate resin; an ethylene vinyl acetate resin; and a polystyrene resin. Furthermore, there are also mentioned: a polyphenylene sulfide resin; a polycarbonate resin; a polyester elastomer resin; a polyamide elastomer resin; a liquid crystal polymer; a polybutylene terephthalate resin; and the like. As the thermoplastic resin, one of these resins may be used singly, or two or more thereof may be used in combination.

Among them, from a viewpoint of heat resistance, the engineering plastics such as polyether sulfone, polysulfone, polyimide and polyether imide are preferable as the thermoplastic resin. Moreover, polyether sulfone excellent in various points such as dynamic characteristics, insulating properties, solubility to a solvent, and the like is more preferable.

Moreover, these thermoplastic resins may have a functional group capable of reacting with the epoxy resin. As the functional group as described above, for example, an amino group, a hydroxyl group, chlorine atoms, an alkoxy group and the like are mentioned.

In the insulating thermally conductive resin composition 1, those shown as follows are mentioned as combinations of the thermosetting resin and the thermoplastic resin, which form the phase-separated structure. For example, in a case of using the epoxy resin as the thermosetting resin, then polyether sulfone and polyether imide can be used as the thermoplastic resin. Moreover, in a case of using the unsaturated polyester resin as the thermosetting resin, then polystyrene can be used as the thermoplastic resin.

In the insulating thermally conductive resin composition 1, the average particle diameter of the small-diameter inorganic filler 4 is 0.1 μm to 15 μm. By the fact that the average particle diameter of the small-diameter inorganic filler 4 is 0.1 μm to 15 μm, it becomes easy to unevenly distribute the small-diameter inorganic filler 4 in the first resin phase 2 (continuous phase) in the phase-separated structure, and an insulating thermally conductive resin composition better in workability and moldability can be obtained. That is to say, by the fact that the average particle diameter is 0.1 μm or more, the viscosity of the resin can be suppressed from being excessively increased, and fluidity of the resin is ensured, and accordingly, the workability and the moldability are improved. Moreover, by the fact that the average particle diameter is 15 μm or less, it becomes easy to unevenly distribute the small-diameter inorganic filler 4 in the first resin phase 2, and accordingly, the thermal conduction paths 6 can be formed, and it becomes possible to enhance the thermal conductivity. Note that the average particle diameter of the small-diameter inorganic filler 4 is preferably 1 μm to 15 μm, more preferably 3 μm to 10 μm.

In the insulating thermally conductive resin composition 1, the average particle diameter of the large-diameter inorganic filler 5 is larger than the average particle diameter of the small-diameter inorganic filler 4. Specifically, the average particle diameter of the large-diameter inorganic filler 5 is 1 μm to 100 μm. By the fact that the average particle diameter of the large-diameter inorganic filler 5 is 1 μm to 100 μm, the large-diameter inorganic filler 5 can be present so as to span the first resin phase 2 and the second resin phase 3. Then, the thermal conduction paths 7 are formed in such a manner that the large-diameter inorganic filler 5 is brought into contact with the unevenly distributed small-diameter inorganic filler 4, and the thermal conduction paths can be effectively formed in the inside of the insulating thermally conductive resin composition 1 by connecting the thermal conduction paths 6 to one another. As a result, the route of the thermal conduction is increased, and it becomes possible to enhance the thermal conduction of the insulating thermally conductive resin composition 1. That is to say, by the fact that the average particle diameter is 1 μm or more, the large-diameter inorganic filler 5 can be effectively brought into contact with the small-diameter inorganic filler 4, and it becomes possible to enhance the thermal conduction. Moreover, by the fact that the average particle diameter is 100 μm or less, a molding appearance of the insulating thermally conductive resin composition 1 can be suppressed from decreasing. Note that the average particle diameter of the large-diameter inorganic filler 5 is preferably 20 μm to 100 μm, more preferably 20 μm to 90 μm.

As mentioned above, the average particle diameter of the small-diameter inorganic filler 4 is 0.1 μm to 15 μm, and the average particle diameter of the large-diameter inorganic filler 5 is 1 μm to 100 μm. However, it is necessary that the large-diameter inorganic filler 5 have a particle diameter sufficient for allowing the large-diameter inorganic filler 5 to span the first resin phase 2 and the second resin phase 3, and further, for mutually and thermally connecting the small-diameter inorganic filler 4 unevenly distributed in the first resin phase 2. Therefore, the average particle diameter of the large-diameter inorganic filler 5 is preferably twice or more the average particle diameter of the small-diameter inorganic filler 4, more preferably, three times or more the same. In such a way, the thermal conduction paths 6 composed of the small-diameter inorganic filler 4 are thermally connected to one another, and it becomes possible to further enhance the thermal conductivity of the whole of the insulating thermally conductive resin composition 1.

Note that, in this description, the "average particle diameter" stands for a median diameter. Moreover, the median diameter stands for a particle diameter (d50) in which an integrated (accumulated) weight percent becomes 50%. For example, the median diameter can be measured by using the laser diffraction-type particle size distribution measuring instrument "SALD2000" (made by Shimadzu Corporation). Note that the average particle diameters of the small-diameter inorganic filler 4 and the large-diameter inorganic filler 5, which are included in the inside of the insulating thermally conductive resin composition 1, can be measured by firing the insulating thermally conductive resin composition 1 and isolating the small-diameter inorganic filler 4 and the large-diameter inorganic filler 5 from each other.

In this embodiment, it is preferable that a ratio of a sum of the small-diameter inorganic filler 4 and the large-diameter inorganic filler 5 in the insulating thermally conductive resin composition 1 (that is, the ratio is [total volume of small-diameter inorganic filler and large-diameter inorganic filler]/[volume of insulating thermally conductive resin composition]) be 10 to 80% by volume. By the fact that the volume ratio of the sum of the small-diameter inorganic filler 4 and the large-diameter inorganic filler 5 is 10% by volume or more, an effect of the enhancement of the thermal conduction, which is brought by the contact between the small-diameter inorganic filler 4 and the large-diameter inorganic filler 5, can be fully expected. Moreover, by the fact that the volume ratio of the sum of the small-diameter inorganic filler 4 and the large-diameter inorganic filler 5 is 80% by volume or less, no difficulty occurs in forming the thermal conduction paths 6 by the small-diameter inorganic filler 4, and further, the viscosity of the resin can be suppressed from being excessively increased by at the time of molding. Note that the volume ratio can be measured by a method to be described later.

Moreover, the ratio of the small-diameter inorganic filler 4 and the large-diameter inorganic filler 5 in the insulating thermally conductive resin composition 1 is more preferably 15 to 80% by volume, still more preferably 20 to 80% by volume, particularly preferably 30 to 70% by volume, most preferably 30 to 60% by volume. By setting the ratio within such a range as described above, it becomes possible to strike a balance between the high thermal conductivity and the moldability.

In the insulating thermally conductive resin composition 1, it is preferable that a ratio of the large-diameter inorganic filler 5 in the sum of the small-diameter inorganic filler 4 and the large-diameter inorganic filler 5 (that is, the ratio is [volume of large-diameter inorganic filler]/[total volume of small-diameter inorganic filler and large-diameter inorganic filler]) be 5 to 60% by volume. By the fact that the volume ratio of the large-diameter inorganic filler 5 is 5% by volume or more, it becomes possible to enhance the thermal conduction, which is brought by the contact thereof with the small-diameter inorganic filler 4. Moreover, by the fact that the volume ratio of the large-diameter inorganic filler 5 is 60% by volume or less, it becomes possible to form the thermal conduction paths 6 by the small-diameter inorganic filler 4. Note that it is more preferable that the ratio of the large-diameter inorganic filler 5 in the sum of the small-diameter inorganic filler 4 and the large-diameter inorganic filler 5 be 20 to 50% by volume.

Here, the insulating thermally conductive resin composition 1 of this embodiment can provide a resin composition, which has electric insulating properties, by using a material exhibiting the electric insulating properties. Then, in the insulating thermally conductive resin composition 1, it is preferable to use an inorganic compound, which combines the thermal conductivity and the electric insulating properties with each other, as a constituent material of the small-diameter inorganic filler 4 and the large-diameter inorganic filler 5.

As the inorganic compound provided with the thermal conductivity, for example, an inorganic compound with a thermal conductivity of 1 W/m·K or more can be used. Note that thermal conductivity of the inorganic compound provided with the thermal conduction is preferably 10 W/m·K or more, more preferable 30 W/m·K or more. Moreover, as an inorganic compound provided with the electric insulating properties, an inorganic compound in which a volume resistivity at room temperature (25° C.) is 10 Ω·cm or more can be used. Note that the volume resistivity of the inorganic compound provided with the electric insulating properties is preferably $10^5$ Ω·cm or more, more preferably $10^8$ Ω·cm or more, particularly preferably $10^{13}$ Ω·cm or more.

As the inorganic compound that combines the thermal conductivity and the electric insulating properties with each other, for example, there can be mentioned boride, carbide, nitride, oxide, silicide, hydroxide, carbonate and the like. Specifically, for example, there are mentioned magnesium oxide (MgO), aluminum oxide ($Al_2O_3$), boron nitride (BN), aluminum nitride (AlN), aluminum hydroxide ($Al(OH)_3$) and the like. Moreover, there are also mentioned silicon dioxide ($SiO_2$), magnesium carbonate ($MgCO_3$), magnesium hydroxide ($Mg(OH)_2$), calcium carbonate ($CaCO_3$), clay, talc, mica, titanium oxide ($TiO_2$), zinc oxide (ZnO) and the like. From viewpoints of the thermal conductivity and easiness of filling, it is preferable that the small-diameter inorganic filler 4 and the large-diameter inorganic filler 5 contain at least one selected from the group consisting of MgO, $Al_2O_3$, BN and AlN. Moreover, it is particularly preferable that the small-diameter inorganic filler 4 and the large-diameter inorganic filler 5 contain at least one of MgO, $Al_2O_3$ and BN.

In order to enhance the compatibility with the resin, dispersibility of the small-diameter inorganic filler 4 and the large-diameter inorganic filler 5 into the insulating thermally conductive resin composition 1 may be enhanced by performing surface treatment such as coupling treatment for the small-diameter inorganic filler 4 and the large-diameter inorganic filler 5, adding a dispersant thereto, and so on. Moreover, by appropriately selecting a surface treatment agent, the small-diameter inorganic filler 4 can be unevenly distributed more effectively in the phase-separated structure.

For the surface treatment, an organic surface treatment agent such as fatty acid, fatty acid ester, higher alcohol and hydrogenated oil can be used. Moreover, for the surface treatment, an inorganic surface treatment agent such as silicone oil, a silane coupling agent, an alkoxysilane compound and a silylation agent can also be used. By using these surface treatment agents, water resistance of the insulating thermally conductive resin composition 1 is sometimes enhanced, and further, the dispersibility thereof into the resin is sometimes enhanced. A treatment method is not particularly limited; however, there are (1) a dry method, (2) a wet method, (3) an integral blending method and the like.

(1) Dry Method

The dry method is a method of performing the surface treatment by dropping the surface treatment agent onto the small-diameter inorganic filler and the large-diameter inorganic filler while stirring the small-diameter inorganic filler and the large-diameter inorganic filler by mechanical stirring using the Henschel mixer, the nauta mixer, the vibration mill and the like. In a case of using silane as the surface treatment agent, there can be used: a solution obtained by diluting silane with an alcohol solvent; a solution obtained by diluting silane with the alcohol solvent and further adding water thereto; a solution obtained by diluting silane with the alcohol solvent and further adding water and acid thereto; and the like. A preparation method of the surface treatment agent is written on a catalog and the like of each maker of the silane coupling agent; however, the preparation method is appropriately determined depending on a hydrolysis rate of silane and a type of the inorganic filler.

(2) Wet Method

The wet method is a method of immersing the small-diameter inorganic filler and the large-diameter inorganic filler directly into the surface treatment agent. A usable surface treatment agent is similar to the above-described drying method. Moreover, a preparation method of the surface treatment agent is also similar to that in the dry method.

(3) Integral Blending Method

The integral blending method is a method of, at a time of mixing a resin and filler with each other, directly adding the surface treatment agent as it is into a mixer or after diluting the same surface treatment agent with alcohol and the like, followed by stirring. A preparation method of the surface treatment agent is similar to those of the dry method and the wet method; however, it is general to increase an amount of the surface treatment agent in a case of performing the surface treatment by the integral blending method in comparison with those of the dry method and the wet method.

In the dry method and the wet method, the surface treatment agent is dried according to needs. In a case of adding such a surface treatment agent using alcohol and the like, it is necessary to volatilize alcohol. If alcohol remains finally in a blended compound, then alcohol is generated as gas, and adversely affects a polymer content. Hence, it is preferable to set a drying temperature at a boiling point of a used solvent or more. Moreover, in the case of using silane as the surface treatment agent, then it is preferable to heat such a blended compound to a high temperature (for example, 100° C. to 150° C.) by using a device in order to rapidly remove silane that has not reacted with the inorganic filler. However, it is preferable to maintain the blended compound at a temperature lower than the decomposition point of silane also in consideration of heat resistance of silane. It is preferable that a treatment temperature approximately range from 80 to 150° C., and that a treatment time range from 0.5 to 4 hours. The drying temperature and the time are appropriately selected depending on a throughput, whereby it becomes possible to remove the solvent and the unreacted silane.

In the case of using silane as the surface treatment agent, an amount of silane, which is required to treat the surface of the inorganic filler, can be calculated by the following expression.

[Amount of silane (g)]=[amount of inorganic filler (g)]×[specific surface area of inorganic filler ($m^2$/g)]/[minimum coating area of silane ($m^2$/g)]

The "minimum coating area of silane" can be obtained by the following calculation expression.

[Minimum coating area of silane ($m^2$/g)]=(6.02×$10^{23}$)×(13×$10^{-20}$ ($m^2$))/[molecular weight of silane]

In the expression, "6.02×$10^{23}$" is the Avogadro constant, and "13×$10^{-20}$" is an area (0.13 $nm^2$) covered by one-molecule silane.

It is preferable that the required amount of silane be 0.5 time or more to less than 1.0 time the amount of silane, which is calculated by this calculation expression. Even if the amount of silane is 1.0 time or more, the effects of the present invention can be exerted. However, in such a case where the amount of silane is 1.0 time or more, an unreacted content remains, causing an apprehension that a decrease of mechanical properties and a decrease of physical properties, such as a decrease of water resistance, may be brought about, and accordingly, it is preferable that an upper limit of the required amount of silane be less than 1.0 time. Moreover, a reason why a lower limit value of the required amount of silane is set at 0.5 time the amount of silane, which is calculated by the above-described calculation expression, is that this lower limit value is sufficient for effectively enhancing a filling capability of the filler into the resin.

As long as the effects of the present invention are not inhibited, a colorant, a flame retarder, a flame-retardant assistant, a fiber reinforcement, a viscosity reducer for viscosity adjustment during the production, a dispersion adjuster for enhancing dispersibility of toner (colorant), a mold release agent and the like may be contained in the insulating thermally conductive resin composition 1. Those known in public can be used as these; however, those shown as below can be mentioned.

As the colorant, for example, there can be used inorganic pigment such as titanium oxide, organic pigment, or toner containing these as main components. One of these colorants may be used singly, or two or more thereof may be used in combination.

As the flame retarder, an organic flame retarder, an inorganic flame retarder, a reactive flame retarder and the like are mentioned. One of these flame retarders may be used singly, or two or more thereof may be used in combination. Note that, in a case of allowing the flame retarder to be contained in the insulating thermally conductive resin composition 1, it is preferable to use the flame-retardant assistant in combination. As the flame-retardant assistant, there are mentioned: an antimony compound such as diantimony trioxide, diantimony tetraoxide, diantimony pentoxide, sodium antimonate, antimony tartrate; zinc borate; barium metaborate; and the like. Moreover, hydrated alumina, zirconium oxide, ammonium polyphosphate, tin oxide, iron oxide and the like are also mentioned. One of these flame-retardant assistants may be used singly, or two or more thereof may be used in combination.

It is preferable that the thermal conductivity of the insulating thermally conductive resin composition 1 of this embodiment be 3 W/m·K or more. Even if the thermal conductivity is less than 3 W/m·K, the effects of the present invention can be exerted. However, by the fact that the thermal conductivity is 3 W/m·K or more, an electronic component can be cooled efficiently even if being miniaturized in a case of using the insulating thermally conductive resin composition 1 as a radiator of the electronic component.

Next, a description is made of a production method of the insulating thermally conductive resin composition of this embodiment. First, the thermosetting resin composing the first resin, the thermoplastic resin composing the second resin, the inorganic filler and the curing agent are added to and kneaded with one another, and a resin composition in an uncured state is produced. Such kneading of the respective components may be performed in one step, or may be performed in a plurality of steps by sequentially adding the respective components. In a case of sequentially adding the respective components, the respective components can be added in an arbitrary order.

As a kneading and adding method of the respective components, for example, a part or whole quantity of the thermoplastic resin is first kneaded with the thermosetting resin, and viscosity of a resultant mixture is adjusted. Next, the mixture is kneaded while sequentially adding thereto the rest, which is the thermoplastic resin, the inorganic filler and the curing agent. An order of such addition is not particularly limited; however, it is preferable to add the curing agent last from a viewpoint of storage stability of the resin composition.

As mentioned above, additives such as the colorant, the flame retarder, the flame-retardant assistant, the fiber reinforcement, the viscosity reducer, the dispersion adjuster and the mold release agent may be added to the resin composition according to needs. Moreover, the order of adding these additives is not particularly limited, either, and the additives can be added in arbitrary steps; however, it is preferable to add the curing agent last as mentioned above.

As a kneading machine device for use in producing the resin composition, those heretofore known in public can be used. Specifically, there can be mentioned a roll mill, a planetary mixer, a kneader, an extruder, a Banbury mixer, a mixing vessel provided with an impeller, a lateral-type mixing tank and the like.

A kneading temperature in an event of producing the resin composition is not particularly limited; however, preferably, ranges from 10 to 150° C. When the kneading temperature exceeds 150° C., then in some case, a partial curing reaction starts, and the storage stability of the obtained resin composition decreases. When the kneading temperature is lower than 10° C., then the viscosity of the resin composition is high, and it becomes substantially difficult to knead the resin composition in some case. The kneading temperature preferably ranges from 20 to 120° C., more preferably 30 to 100° C.

An arbitrary method is possible as a molding method of the uncured resin composition, and an arbitrary shape is possible as the molded shape. For example, as molding means, there can be used a variety of means such as compression molding (direct pressure molding), transfer molding, injection molding, extrusion molding, and screen printing.

The insulating thermally conductive resin composition according to this embodiment includes the phase-separated structure including: the first resin phase 2 in which the first resin continues three-dimensionally; and the second resin phase 3, which is different from the first resin phase 2 and is formed of the second resin. Moreover, the insulating thermally conductive resin composition includes: the small-diameter inorganic filler 4, which is unevenly distributed in the first resin phase 2; and the large-diameter inorganic filler 5, which spans the first resin phase 2 and the second resin phase 3, and thermally connects the pieces of the small-diameter inorganic filler 4, which is unevenly distributed in the first resin phase 2, to one another. Then, the average particle diameter of the small-diameter inorganic filler 4 is 0.1 to 15 µm. Moreover, the average particle diameter of the large-diameter inorganic filler 5 is larger than the average particle diameter of the small-diameter inorganic filler 4, and is 1 to 100 µm. With such a configuration, the large-diameter inorganic filler thermally connects the thermal conduction paths, which are composed of the small-diameter inorganic filler, to one another, and accordingly, the thermal conduction paths are formed more effectively. As a result, the thermal conduction routes in the resin composition are increased, and accordingly, the thermal conductivity is enhanced though the filling amount of the thermally conductive inorganic filler is small. Furthermore, by the fact that the filling amount of the thermally conductive inorganic filler is small, the fluidity of the insulating thermally conductive resin composition is ensured, and accordingly, the moldability is enhanced, and the workability is improved. Moreover, as mentioned above, the insulating thermally conductive resin composition of this embodiment is composed of the materials having the electric insulating properties, and accordingly, the whole of the resin composition can be provided with high electric insulating properties.

EXAMPLES

A description is made below of the present invention in more detail by examples and comparative examples; however, the present invention is not limited to these examples.

In an event of producing resin compositions of the examples and the comparative examples, resins, a curing agent and inorganic fillers, which are described below, were used.

(Thermosetting Resin)

Epoxy resin ("jER (registered trademark) 828" made by Mitsubishi Chemical Corporation, epoxy equivalent weight: 189 g/eq, hereinafter, also referred to as DGEBA (bisphenol A diglycidyl ether)

(Thermoplastic Resin)

Polyether sulfone ("SUMIKAEXCEL (registered trademark) 5003P" made by Sumitomo Chemical Company, Limited, hereinafter, also referred to as PES)

(Curing Agent)

4,4'-methylenedianiline (made by Wako Pure Chemical Industries, Ltd., active hydrogen equivalent weight: 49.5 g/eq, hereinafter, also referred to as MDA)

(Inorganic Filler)

Small-diameter inorganic filler A: MgO, average particle diameter (d50): 8 µm

Small-diameter inorganic filler B: BN, average particle diameter (d50): 8 µm

Small-diameter inorganic filler C: $Al_2O_3$, average particle diameter (d50): 5 µm Small-diameter inorganic filler D: $Al(OH)_3$, average particle diameter (d50): 8 µm Small-diameter inorganic filler E: $Al_2O_3$, average particle diameter (d50): 1.2 µm Small-diameter inorganic filler F: $Al_2O_3$, average particle diameter (d50): 0.6 µm Large-diameter inorganic filler A: MgO, average particle diameter (d50): 25 µm Large-diameter inorganic filler B: MgO, average particle diameter (d50): 80 µm Large-diameter inorganic filler C: $Al(OH)_3$, average particle diameter (d50): 35 µm Large-diameter inorganic filler D: $Al_2O_3$, average particle diameter (d50): 10 µm Large-diameter inorganic filler E: $Al_2O_3$, average particle diameter (d50): 3 µm Example 1

22.3 parts by mass of PES pulverized so that an average particle diameter thereof could be 10 µm were added to 100 parts by mass of DGEBA. Moreover, this mixture was stirred in an oil bath warmed up to 120° C., whereby PES was completely dissolved into DGEBA, and an epoxy resin solution was obtained.

Next, by using a roll mill set at 80° C., 70 parts by mass of the small-diameter inorganic filler A and 10 parts by mass of the large-diameter inorganic filler A were kneaded with the above-mentioned epoxy resin solution. Moreover, 26 parts by mass of MDA were kneaded with the kneaded epoxy resin solution. Thereafter, a kneaded mixture thus obtained was put into a vacuum dryer set at 120° C., and was subjected to vacuum degassing for 5 minutes, whereby a resin composition was obtained.

This resin composition was put into a die warmed up to 150° C., was held at 150° C. in a drying oven for 2 hours, and further, was heated at 180° C. for 2 hours, whereby a test piece of this example was obtained.

Examples 2, 6 and 7 and Comparative Examples 1, 2, 5 and 6

Test pieces of the respective examples were obtained in a similar way to Example 1 except that the small-diameter inorganic filler, the large-diameter inorganic filler and the blending amounts of these were changed as those shown in Table 1.

Example 3

22.3 parts by mass of PES pulverized so that an average particle diameter thereof could be 10 μm were added to 100 parts by mass of DGEBA. Next, this mixture was stirred in an oil bath warmed up to 120° C., whereby PES was completely dissolved into DGEBA, and an epoxy resin solution was obtained.

Next, by using a roll mill set at 120° C., 300 parts by mass of the small-diameter inorganic filler C, 75 parts by mass of the large-diameter inorganic filler A and 75 parts by mass of the large-diameter inorganic filler C were kneaded with the above-mentioned epoxy resin solution. Thereafter, a kneaded mixture was slowly cooled down to 80° C. Moreover, by using a roll mill set at 80° C., 26 parts by mass of MDA were kneaded with the kneaded mixture thus cooled down slowly, whereby a resin composition was obtained.

This resin composition was put into top and bottom dies set at 150° C., and was pressed with a molding pressure of 1 MPa at a die temperature of 150° C. for 2 hours. Thereafter, such a cured product thus pressed was taken out of the dies, and was heated at 180° C. in a drying oven for 2 hours, whereby a test piece of this example was obtained.

Examples 4 and 5, Comparative Examples 3 and 4

Test pieces of the respective examples were obtained in a similar way to Example 3 except that the small-diameter inorganic filler, the large-diameter inorganic filler and the blending amounts of these were changed as those shown in Table 1.

TABLE 1

| Blending amounts (parts by mass) | | | Example 1 | Example 2 | Example 3 | Example 4 | Example 5 | Example 6 | Example 7 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|---|
| Thermosetting resin | DGEBA | | 100 | 100 | 100 | 100 | 100 | 100 | 100 | 100 | 100 | 100 | 100 | 100 | 100 |
| Thermoplastic resin | PES | | 22.3 | 22.3 | 22.3 | 22.3 | 22.3 | 22.3 | 22.3 | 22.3 | 22.3 | 22.3 | 22.3 | 22.3 | 22.3 |
| Curing agent | MDA | | 26 | 26 | 26 | 26 | 26 | 26 | 26 | 26 | 26 | 26 | 26 | 26 | 26 |
| Inorganic filler | Small-diameter inorganic filler A (MgO, d50: 8 μm) | | 70 | 0 | 0 | 0 | 0 | 0 | 0 | 80 | 50 | 75 | 400 | 0 | 0 |
| | Small-diameter inorganic filler B (BN, d50: 8 μm) | | 0 | 110 | 0 | 0 | 0 | 0 | 0 | 0 | 110 | 0 | 0 | 0 | 0 |
| | Small-diameter inorganic filler C (Al$_2$O$_3$, d50: 5 μm) | | 0 | 0 | 300 | 500 | 300 | 0 | 0 | 0 | 0 | 300 | 500 | 0 | 0 |
| | Small-diameter inorganic filler D (Al(OH)$_3$, d50: 8 μm) | | 0 | 0 | 75 | 0 | 0 | 0 | 0 | 0 | 0 | 75 | 0 | 0 | 0 |
| | Small-diameter inorganic filler E (Al$_2$O$_3$, d50: 1.2 μm) | | 0 | 0 | 0 | 0 | 0 | 105 | 0 | 0 | 0 | 0 | 0 | 210 | 0 |
| | Small-diameter inorganic filler F (Al$_2$O$_3$, d50: 0.6 μm) | | 0 | 0 | 0 | 0 | 0 | 0 | 85 | 0 | 0 | 0 | 0 | 0 | 90 |
| | Large-diameter inorganic filler A (MgO, d50: 25 μm) | | 10 | 0 | 0 | 0 | 0 | 0 | 0 | 0 | 0 | 0 | 0 | 0 | 0 |
| | Large-diameter inorganic filler B (MgO, d50: 80 μm) | | 0 | 50 | 0 | 400 | 600 | 0 | 0 | 0 | 0 | 0 | 0 | 0 | 0 |
| | Large-diameter inorganic filler C (Al(OH)$_3$, d50: 35 μm) | | 0 | 0 | 75 | 0 | 0 | 0 | 0 | 0 | 0 | 0 | 0 | 0 | 0 |
| | Large-diameter inorganic filler D (Al$_2$O$_3$, d50: 10 μm) | | 0 | 0 | 0 | 0 | 0 | 105 | 0 | 0 | 0 | 0 | 0 | 0 | 0 |
| | Large-diameter inorganic filler E (Al$_2$O$_3$, d50: 3 μm) | | 0 | 0 | 0 | 0 | 0 | 0 | 5 | 0 | 0 | 0 | 0 | 0 | 0 |

Volume ratios of the inorganic fillers, thermal conductivities and moldabilities in the respective test pieces of the examples and the comparative examples were measured/evaluated by the following method. Measurement/evaluation results are shown in Table 2.

[Volume Ratio of Inorganic Filler]

First, a volume of the test piece in each of the examples was calculated by the Archimedean method. Next, each of the test pieces was fired at 625° C. by using a muffle furnace, and a weight of an ash content was measured. Then, since the ash content is the inorganic fillers, a total volume ratio of the small-diameter and large-diameter inorganic fillers and a volume ratio of the large-diameter inorganic filler in the test piece were measured based on compounding ratios and densities of the small-diameter and large-diameter inorganic fillers, the weight of the ash content and the volume of the test piece. Note that the densities were defined as: 3.65 g/cm$^3$ for MgO, 2.27 g/cm$^3$ for BN, 3.9 g/cm$^3$ for Al$_2$O$_3$, and 2.42 g/cm$^3$ for Al(OH)$_3$. Moreover, the density of Al(OH)$_3$ was calculated also in consideration of dehydration.

[Thermal Conductivity]

The thermal conductivity of each of the examples was obtained from a product of a thermal diffusivity, a specific heat and the density. In this event, the thermal diffusivity was measured by the Xe flash analyzer LFA447 Nanoflash made by NETZSCH GmbH, and the specific gravity and the specific heat were measured by the Archimedean method (water displacement method). Moreover, the specific heat was measured by the DSC method by using DSC6220 made by Seiko Instruments Inc.

[Moldability]

Such molding processability was determined by the following criteria based on a molded situation of a plate-like test piece in an event of putting the resin composition in each of the examples and the comparative examples into a die with a length and breadth of 100 mm and a thickness of 2.0 mm. Note that such a determination was performed by visually observing the test piece or observing a cross section thereof by a scanning electron microscope (SEM).

○(good): The plate-like test piece was able to be molded with no molding defect being observed.

x (failure): The molding resulted in being short shot, and the test piece was not able to be molded. Alternatively, a molding defect such as a void was observed.

TABLE 2

| | Example 1 | Example 2 | Example 3 | Example 4 | Example 5 | Example 6 | Example 7 |
|---|---|---|---|---|---|---|---|
| Total volume ratio of small-diameter and large-diameter inorganic fillers (% by volume) | 15 | 33 | 51 | 66 | 66 | 30 | 15 |
| Volume ratio of large diameter inorganic filler (% by volume) | 12 | 22 | 40 | 46 | 68 | 50 | 5 |
| Thermal conductivity of resin composition (W/mK) | 0.7 | 3.9 | 5.2 | 10.2 | 6.8 | 1.3 | 0.4 |
| Moldability | ○ | ○ | ○ | ○ | ○ | ○ | ○ |

| | Comparative Example 1 | Comparative Example 2 | Comparative Example 3 | Comparative Example 4 | Comparative Example 5 | Comparative Example 6 |
|---|---|---|---|---|---|---|
| Total volume ratio of small-diameter and large-diameter inorganic fillers (% by volume) | 15 | 35 | 51 | 66 | 30 | 15 |
| Volume ratio of large diameter inorganic filler (% by volume) | 0 | 0 | 0 | 0 | 0 | 0 |
| Thermal conductivity of resin composition (W/mK) | 0.4 | 1.8 | 3.1 | 6.6 | 0.7 | 0.2 |
| Moldability | ○ | ○ | ○ | x | ○ | ○ |

From Table 2, in comparison with Comparative examples 1 to 6, Examples 1 to 7 exhibited high thermal conductivities though the volume ratios of the individual inorganic fillers were the same.

Here, a reason why the thermal conductivity in Example 5 became lower than the thermal conductivity in Example 4 is conceived to be that, since the volume ratio of the large-diameter inorganic filler was large, the thermal conduction paths of the small-diameter inorganic filler by the phase separation were not formed sufficiently, and the formation of the phase-separated structure was adversely affected. However, when it is considered that the test piece was not able to be molded since the viscosity was increased in Comparative example 4 in which the volume ratio of the inorganic fillers was the same, it is understood that Example 5 is also useful.

Figure 4:
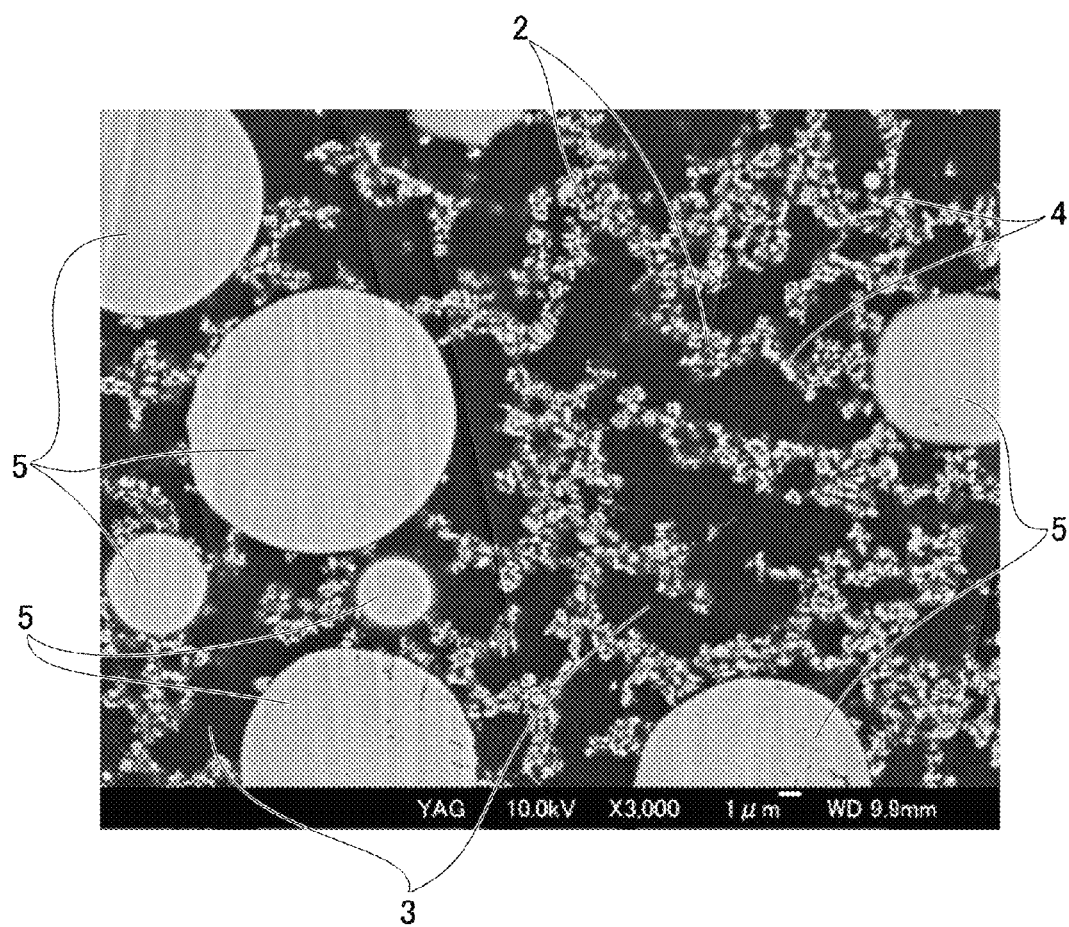
FIG. 4 is a scanning electron microscope picture showing a cross section of an insulating thermally conductive resin composition of Example 6.

Moreover, FIG. 4 shows a result of observing a cross section of the insulating thermally conductive resin composition of Example 6 by the scanning electron microscope. As shown in FIG. 4, it is understood that the small-diameter inorganic filler 4 is unevenly distributed in the first resin phase 2, and further, that the large-diameter inorganic filler 5 spans the first resin phase 2 and the second resin phase 3. Then, it can be confirmed that the large-diameter inorganic filler 5 is brought into contact with and thermally connected to the thermal conduction paths composed of the small-diameter inorganic filler 4.

Figure 5:
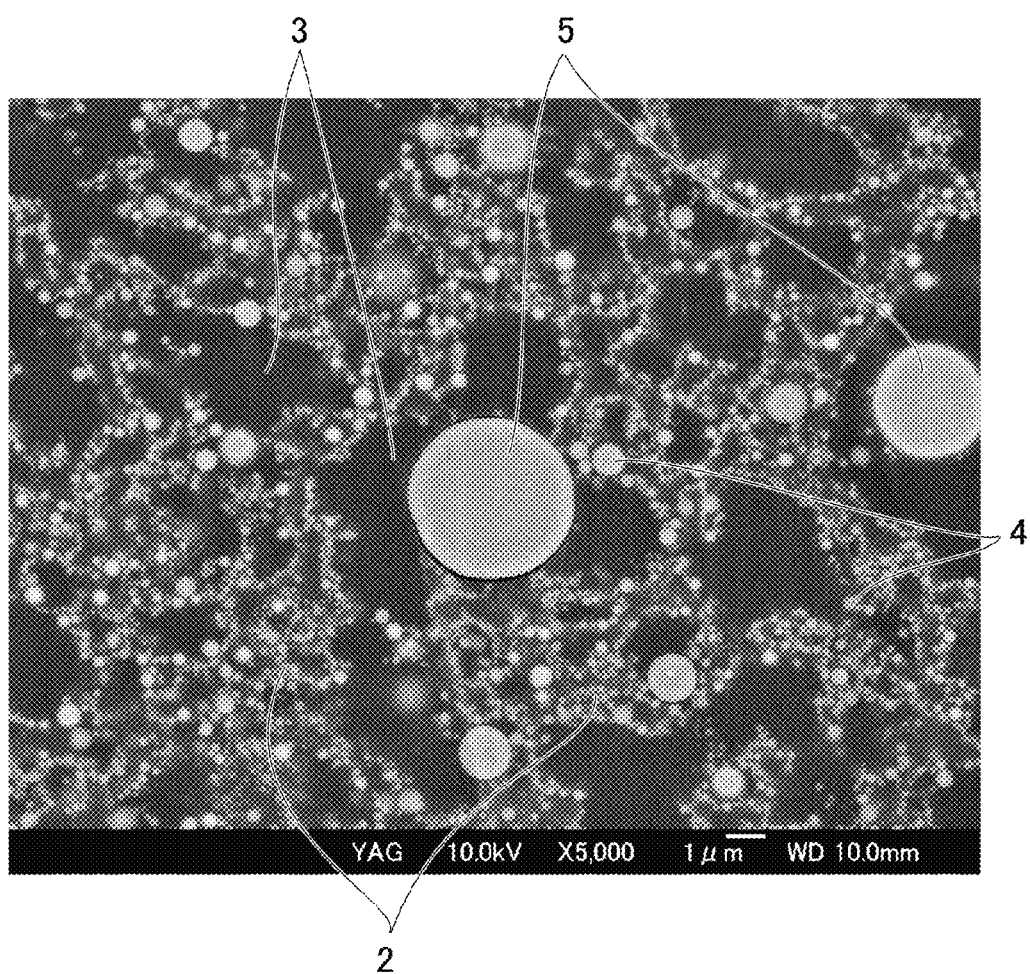
FIG. 5 is a scanning electron microscope picture showing a cross section of an insulating thermally conductive resin composition of Example 7.

FIG. 5 shows a result of observing a cross section of the insulating thermally conductive resin composition of Example 7 by the scanning electron microscope. As shown in FIG. 5, it is understood that, in Example 7, the small-diameter inorganic filler 4 is present on the interface between the first resin phase 2 and the second resin phase 3. Moreover, it is understood that the small-diameter inorganic filler 4 is present more on the interface between the first resin phase 2 and the second resin phase 3 than in a center portion of the first resin phase 2. In particular, the small-diameter inorganic filler 4 is disposed so as to be brought into contact with the interface between the first resin phase 2 and the second resin phase 3, and as a result, it can be confirmed that the continuous thermal conduction paths 6 are formed.

Note that, in Example 7, the first resin phase is formed of polyether sulfone, and further, polyether sulfone contains sulfur. Therefore, in a case where the obtained resin composition is observed by the scanning electron microscope, the first resin phase containing sulfur turns to gray in comparison with the second resin phase. Hence, the first resin phase, the second resin phase and the interface therebetween can be determined by such a scanning electron microscope picture.

The entire content of Japanese Patent Application No. P2013-068846 (filed on Mar. 28, 2013) is herein incorporated by reference.

Although the present invention has been described above by reference to the embodiments and the example, the present invention is not limited to those, and it will be apparent to these skilled in the art that various modifications and improvements can be made.

INDUSTRIAL APPLICABILITY

In the insulating thermally conductive resin composition of the present invention, the small-diameter inorganic filler is unevenly distributed in the first resin phase, and further, the large-diameter inorganic filler, which spans the first resin phase and the second resin phase, is present. Therefore, a plurality of the thermal conduction paths composed of the small-diameter inorganic filler are thermally connected to one another by the large-diameter inorganic filler, and accordingly, a large number of the thermal conduction paths are generated. As a result, the thermal conductivity is enhanced though the filling amount of the thermally conductive inorganic filler is small. Furthermore, by the fact that the filling amount of the thermally conductive inorganic filler is small, the fluidity of the resin composition is ensured, and accordingly, the moldability is enhanced, whereby the workability is improved.

REFERENCE SIGNS LIST

1 INSULATING THERMALLY CONDUCTIVE RESIN COMPOSITION
2 FIRST RESIN PHASE
3 SECOND RESIN PHASE
4 SMALL-DIAMETER INORGANIC FILLER
5 LARGE-DIAMETER INORGANIC FILLER

The invention claimed is:

1. An insulating thermally conductive resin composition, comprising:
a phase-separated structure including: a first resin phase in which a thermoplastic resin continues three-dimensionally; and a second resin phase different from the first resin phase and formed of a thermosetting resin;
small-diameter inorganic filler unevenly distributed in the first resin phase; and
large-diameter inorganic filler that spans the first resin phase and the second resin phase and thermally connects pieces of the small-diameter inorganic filler to one another, the small-diameter inorganic filler being unevenly distributed in the first resin phase,
wherein an average particle diameter of the small-diameter inorganic filler is 0.1 to 15 µm, and an average particle diameter of the large-diameter inorganic filler is twice or more the average particle diameter of the small-diameter inorganic filler, and is 1 to 100 µm, and
wherein, in the first resin phase, thermal conduction paths are formed by bringing the pieces of the small-diameter inorganic filler in contact with one another.

2. The insulating thermally conductive resin composition according to claim 1, wherein the small-diameter inorganic filler is present on an interface between the first resin phase and the second resin phase.

3. The insulating thermally conductive resin composition according to claim 1, wherein the small-diameter inorganic filler is brought into contact with an interface between the first resin phase and the second resin phase, or spans the interface.

4. The insulating thermally conductive resin composition according to claim 1,
wherein an amount of a sum of the small-diameter inorganic filler and the large-diameter inorganic filler in the insulating thermally conductive resin composition is 10 to 80% by volume, and
an amount of the large-diameter inorganic filler in the sum of the small-diameter inorganic filler and the large-diameter inorganic filler is 5 to 60% by volume.

5. The insulating thermally conductive resin composition according to claim 1, wherein the small-diameter inorganic filler and the large-diameter inorganic filler contain at least one selected from the group consisting of MgO, $Al_2O_3$, BN and AlN.

6. The insulating thermally conductive resin composition according to claim 1,
wherein
the thermosetting resin is an epoxy resin, and the thermoplastic resin is polyether sulfone.

7. The insulating thermally conductive resin composition according to claim 6,
wherein the phase-separated structure is a bicontinuous structure,
the small-diameter inorganic filler and the large-diameter inorganic filler contain at least one of MgO, $Al_2O_3$ and BN,
an amount of a sum of the small-diameter inorganic filler and the large-diameter inorganic filler in the insulating thermally conductive resin composition is 20 to 80% by volume, and
thermal conductivity of the insulating thermally conductive resin composition is 3 W/m·K or more.

* * * * *